United States Patent [19]

Bancon

[11] Patent Number: 4,636,135
[45] Date of Patent: Jan. 13, 1987

[54] TOOL-HOLDER FOR INDUSTRIAL ROBOT

[75] Inventor: Georges R. Bancon, Vandoeuvre, France

[73] Assignee: Societe Syspro, Nancy, France

[21] Appl. No.: 588,405

[22] Filed: Mar. 12, 1984

[30] Foreign Application Priority Data

Mar. 11, 1983 [FR] France .................. 83 04059

[51] Int. Cl.[4] ............................................. B66C 1/10
[52] U.S. Cl. .............................. 414/730; 81/177.85;
294/82.28; 403/322; 403/325; 901/28; 901/37; 901/41
[58] Field of Search .............. 414/729, 730, 735;
901/27–29, 37, 41–43; 403/322, 325, 328;
81/177 G; 294/86 AA, 83 R, 82.28

[56] References Cited

U.S. PATENT DOCUMENTS

| 2,820,655 | 1/1958 | Hileman | 403/349 |
|---|---|---|---|
| 3,229,656 | 1/1966 | Bodey | 901/41 X |
| 4,227,853 | 10/1980 | Woodford et al. | 403/322 X |
| 4,370,091 | 1/1983 | Gagliardi | 901/29 X |
| 4,393,298 | 7/1983 | Frantzreb | 901/42 X |
| 4,500,065 | 2/1985 | Hennekes et al. | 901/41 X |

FOREIGN PATENT DOCUMENTS

| 1243779 | 9/1960 | France | 211/60.1 |
|---|---|---|---|
| 2076132 | 10/1971 | France . | |
| 618809 | 3/1961 | Italy | 294/82.28 |

OTHER PUBLICATIONS

IBM Technical Disclosure Bulletin, vol. 24, No. 6, Nov. 1981, "Tool Changer for Robotic Assembly", Bothun et al.

Primary Examiner—Donald W. Underwood
Attorney, Agent, or Firm—Sughrue, Mion, Zinn, Macpeak & Seas

[57] ABSTRACT

Tool-holder B for gripping and changing tools for an industrial robot suitable for fixing to a rotary wrist-joint (5) of a robot arm, intended to carry one tool at a time. This tool-holder B comprises an upstream part C able to be fixed to the wrist-joint (5), a downstream part D able to be fixed to a tool (E1, . . . ) and remaining integral with the latter at each tool change, the two parts C and D being equipped with additional means for assembly and for rapid locking as well as unlocking and with detachable connectors (28, 32; 29, 37) for supplying the tool (E1) with fluid and electricity, the upstream part C containing a jack (7, 22) capable of displacing the locking and unlocking components (25, 41, 42, 14, 15, 16), and the downstream part D can be arranged in a tool magazine with the associated tool. The one-piece nature of the tool gripped in the tool-holder B ensures ease and speed of the robot's arm movements in space, maximum robot reliability, as well as rapid and powerful locking and unlocking.

14 Claims, 7 Drawing Figures

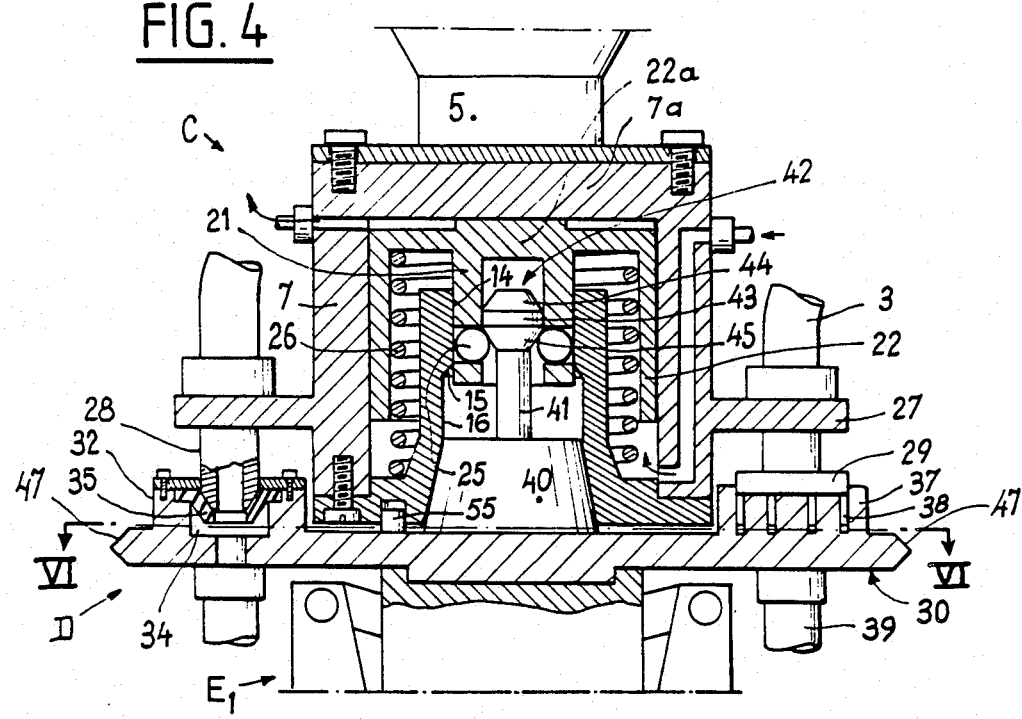
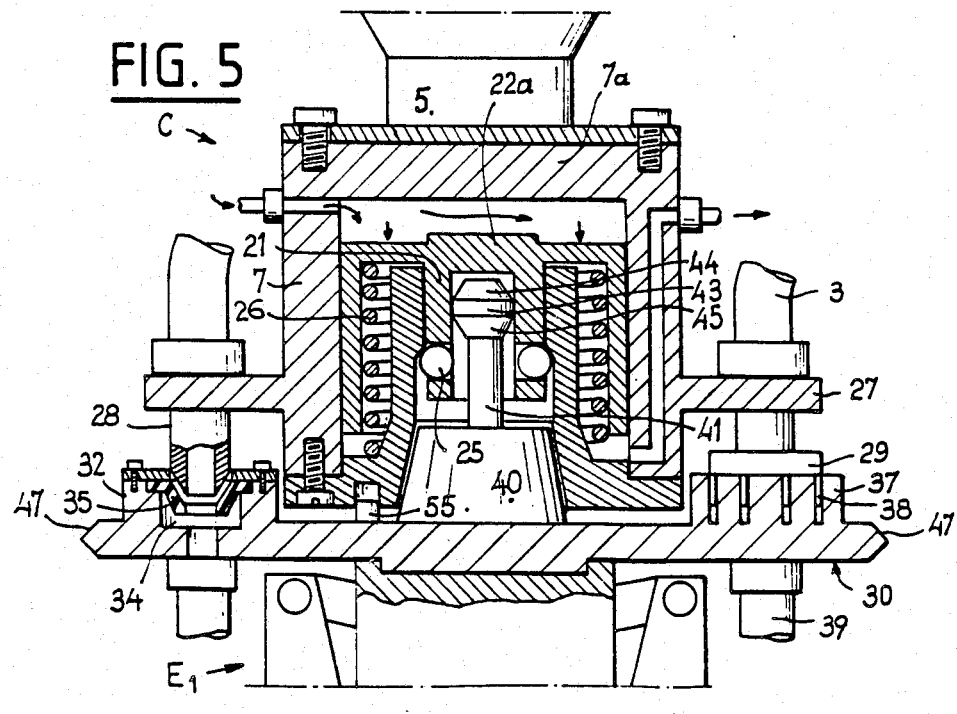

TOOL-HOLDER FOR INDUSTRIAL ROBOT

The present invention relates to a tool-holder for an industrial robot.

An automatic handling or manipulating device with articulated arms effecting movements in space, operated by a hydraulic plant and electrical or electro-pneumatic drive, is called an industrial robot. A robot of this kind has capabilities of strength, of precision and of repetition which are fully made use of by means of one or more tools mounted at the end of an articulated arm, this end sometimes called a wrist-joint.

More precisely, the invention concerns a tool-holder for gripping a tool suitable for fixing to the wrist-joint of a robot in order to carry out handling operations either, in the case of small successive batches of different production runs and in which a tool used for a small batch must be replaced by another tool for a new small batch of a different production run, or, in the case of small, medium or large batches of unit assemblies, each unit assembly requiring successively, for example: a tool for detecting a presence (sensor), a tool for holding (grip: a clamp or a suction device), a tool for milling, a tool for drilling, a tool for tapping, a tool for screwing, a tool for blowing to remove chips, a tool for welding, a tool for measuring (a dimension, a current strength), a tool for verification, and a spindle motor.

In such a unit assembly of a relatively complex product (for example, the assembly of a gate-valve), it is necessary to change tools on a number of occasions and each time rapidly. This is the first problem posed in the use of an industrial robot.

Robots are known where the wrist-joint is fitted with a flange or with another means of connection, onto which a corresponding fixing flange is bolted, to which a single tool is already fixed. This arrangement is suitable for large batch production, for example production lines, with the same tool, but is not suitable for a batch of unit assemblies because the tool change by unbolting and rebolting of the tool flange on the robot wrist-joint fixing flange would be too slow.

A tool-holder fixed by bolting to the robot wrist-joint flange and carrying a multiplicity of tools, with the consequent possibility of rapidly changing a tool, is also known. A tool-holder of this type is either of the rotary barrel type carrying several tools at a time about an axis of rotation incidental with the axis of rotation of the robot wrist-joint, or of the type carrying several tools also sited outside the axis of rotation of the robot wrist-joint, but unable to rotate about the said axis, for example in aligned manner.

Where a robot is concerned, a tool-holder carrying several tools at once has the disadvantage of making the robot carry a substantial weight of tooling.

It also has the geometric disadvantage of being unable to use the robot wrist-joint axis of rotation as axis of rotation of the tool, which complicates and makes onerous the mounting arrangement which enables the rotation of each of the tools in the tool-holder. Because of this, at least one additional independent motor may prove to be necessary to drive the tools in rotation. Also because of this, complicated means of driving each tool in rotation, using software, are necessary, in the case of several tools mounted in parallel and in alignment outside the axis of rotation of the wrist-joint.

To the weight disadvantage, the size disadvantage of the tool-holder is added, which can hinder or even prevent certain robot operations.

In other respects, a tool-holder carrying several tools at a time is often designed to be suitable for the greatest possible number of cases, so that one or several tools may possibly not be designed as tools specific to a precise function, but designed in a universal manner, usable and adaptable for similar but not identical functions. Now, it is known that universal tools are less effective (as regards precision, reliability, speed and strength) than tools truly specific to defined functions.

Finally, French Pat. No. 2,076,132 describes a device for locking a single tool onto the spindle of a machine-tool, allowing automatic and rapid changing of the tool.

The spindle and the tool are provided with additional cone couplings, a coaxial drive stem able to slide with respect to the tool and to the spindle. The tool drive stem is provided with two annular grooves for housing two ball rings in withdrawn position, and with a drive cone cooperating with one of the ball rings. A coaxial sliding sleeve, housing the two ball rings, is placed between the drive stem and the spindle.

This device has the object of avoiding a fierce traction of the tool towards the spindle (of the tool cone coupling towards that of the spindle) and, correlatively, risks of impact causing serious damage. The balls are movable axially and radially with respect to the spindle axis due to the shaped grooves in the drive stem. One of the rings reduces the speed of translation of the sleeve with respect to that of the drive stem in order to avoid fierce traction. The other ring makes solid the sleeve and the cone of the tool a unit during translation. Neither of these ball rings has a locking function.

The object of the invention, then, is to produce a tool-holder carrying a single tool specific to each function envisaged, that is to say perfectly designed for this function, with the possibility of holding this tool firmly locked, and of being able to change it rapidly.

The tool-holder for gripping and changing tools for an industrial robot aimed at by the invention is suitable for fixing to a rotary wrist-joint of a robot arm and comprises means of support for a single tool with a cone coupling cooperating with these means.

In accordance with the invention, the tool-holder comprises two parts capable of being successively assembled and locked together, then separated, namely:

an upstream part able to be fixed to the wrist-joint of the robot, a downstream part able to be fixed to a tool and remaining integral with the latter at each tool change so as to serve as a support for it, these two parts upstream and downstream being equipped with additional means for assembly and for rapid locking as well as unlocking, and with detachable paired connection means to ensure the energy supply to the tool, the upstream part containing a drive component to displace the locking and unlocking components, and the downstream part is suitable for arrangement in a tool magazine with the associated tool, in a removable manner and accessible to the upstream part carried by the robot arm.

Thus, to each tool arranged in the magazine, there is fixed a downstream part which can be locked to the upstream part carried by the robot arm, then unlocked rapidly by means of the drive component of the upstream part, when a tool change is necessary.

According to one embodiment of the invention, the upstream part comprises as drive component for the means of locking and of unlocking, a double-acting jack comprising a cylinder open at the bottom and provided with a head by which it is fixed to the wrist-joint, a skirt sliding as a piston in the cylinder and integral with a sleeve arranged coaxially in the cylinder, and capable of sliding on a retaining lining, integral with the bottom of the cylinder, under the action of the said jack whilst a central female cone is formed in the lower part of the lining open towards the bottom.

According to other features of the invention, the means of locking of the upstream and downstream parts comprise:

in the upstream part: locking driving means, integral in translation with the sleeve and comprising a ball ring housed in a series of orifices arranged in the tubular wall of the movable sleeve, inside the fixed lining which is surrounded by the coaxial skirt of the sleeve, in the downstream part: locking driven means comprising: a stem coaxial with the male cone and having at its end a head capable of sliding inside the central bore of the sleeve and of cooperating with the balls with the object of locking in axial translation the upstream and downstream parts, and, between the locking driving and driven means, rolling and bearing surfaces for the balls, comprising, in the upstream part, successively from top to bottom: a bore in the lining for the axial locking of the upstream and downstream parts, a flared slope in the shape of a truncated cone as well as a disengagement bore of greater diameter than the bore of the lining, in which the sleeve slides, this slope and this disengagement allowing a radial withdrawal of the balls towards the outside of the sleeve for the axial unlocking of the upstream and downstream parts.

Because of this arrangement, the tool-holder according to the invention provides the robot wrist-joint with the advantages of light weight since there is only one tool at a time, maximum reliability particularly by reason of the perfect specific suitability of each tool designed for a well-defined function, and security of fixing.

Other features and advantages of the invention will become apparent during the following description, with reference to the attached drawing which shows two embodiments by way of non-limiting example.

FIG. 4 is a view similar to FIG. 3 showing the tool and the downstream part locked in the upstream part of the tool-holder;

FIG. 5 is a view similar to FIG. 4 showing the downstream part unlocked after freeing of the coupling cones;

Figure 1:
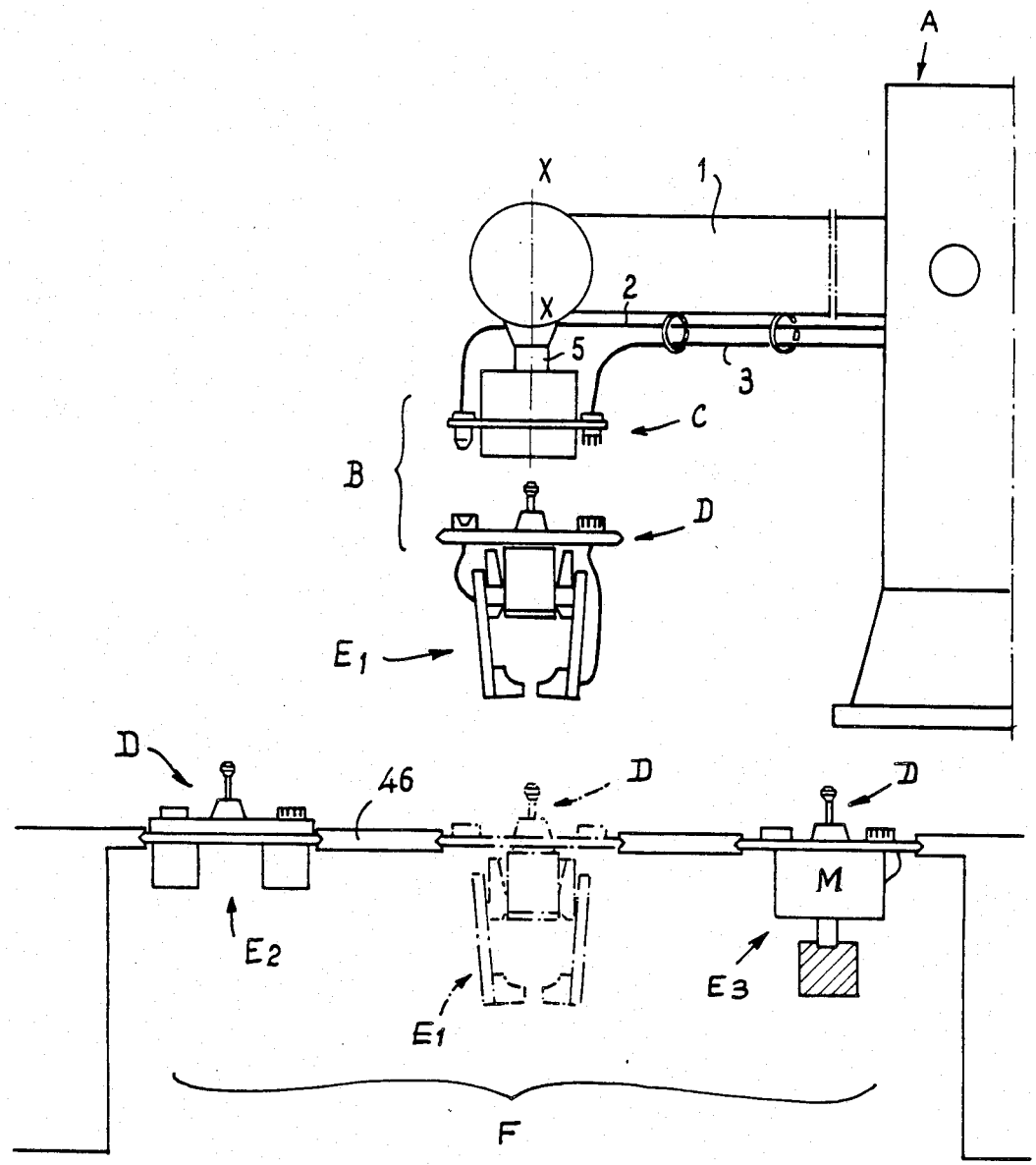
FIG. 1 is a schematic view in elevation of the general arrangement of an installation comprising an industrial robot, the upstream part of the tool-holder fixed to the robot wrist-joint, the downstream part of the tool-holder integral with a tool and a magazine or rack carrying various tools.
Figure 2:
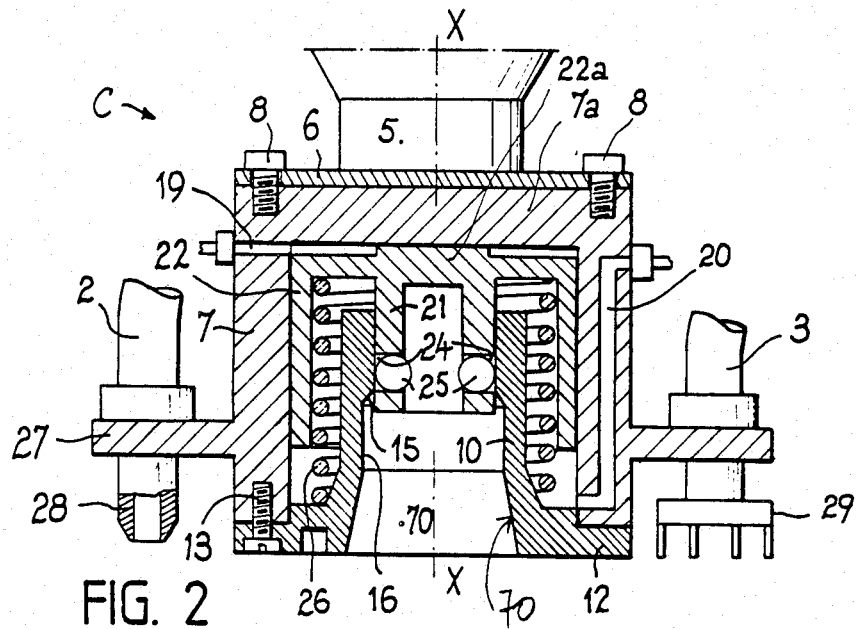
FIG. 2 is an axial section of enlarged scale compared with FIG. 1 of the upstream part of the tool-holder.

The installation shown schematically in FIG. 1 comprises an industrial robot A provided with an arm 1 and with a wrist-joint 5 connected to the arm 1 by a joint 4, a tool-holder designated by the general reference B for gripping and changing tools for the robot A, suitable for fixing to the wrist-joint 5 in a rotary manner about a vertical axis X—X, a tool E1 fixed to the tool-holder B, and a tool-holding rack or magazine F.

The arm 1 carries connections 2 and 3, in a manner known per se, intended to supply respectively the tool-holder B and the tool E1 (or one of the other tools in the magazine F) with fluid under pressure and with electrical energy.

The tool-holder B is intended to support any one of tools E1, E2, E3, . . . of the magazine F, one at a time. In this example, the magazine is provided with three tools, namely a gripping clamp E1, a suction gripping device E2, and an electric machine milling-tool E3, comprising a drive M.

The tool-holder B comprises two parts able to be successively assembled and locked together, then separated, namely:

an upstream part C able to be fixed to the wrist-joint 5 of the robot A, a downstream part D able to be fixed to a tool such as E1, and remaining integral with the latter at each tool change so as to serve as a support for it.

The two parts upstream C and downstream D are fitted with additional means for assembly and for rapid locking as well as unlocking, and with paired and detachable connection means, to ensure the energy supply to the tool E1, E2, . . . by wiring 2, 3, the upstream part C containing a drive component to displace the locking and unlocking components, the downstream part D being suitable for arrangement in the magazine F with the associated tool E1, E2, . . . in a removable manner and accessible to the upstream part C. :

The upstream part C will first be described with particular reference to FIGS. 2 to 6.

The previously mentioned drive component for the locking and unlocking means is constituted by a double acting jack comprising a cylinder 7 of axis X—X, open at the bottom and provided with a head 7a by which it is fixed to the wrist-joint 5 with a flange 6 interposed and made integral with the head 7a by screws 8. Inside the cylinder 7, a cylindrical skirt 22 is mounted so as to slide provided with a head 22a of one piece construction with the skirt 22 and with a cylindrical sleeve 21 coaxial with the cylinder 7 and with the skirt 22. The part 22, 22a, 21 can thus slide inside the cylinder as a piston, along the axis X—X.

The sleeve 21 can itself slide in a retaining lining 10, of axis X—X, integral with the bottom of the cylinder 7 opposite the head 7a, under the action of the jack 7, 22 and a central female cone 70, of axis X—X, is formed in the bottom part of the lining 10 open at the bottom. At its base, the lining 10 has a flange 12 fixed to the cylinder 7 by screws 13. A pipe 19 arranged in the cylinder 7 emerges between the heads 7a and 22a, therefore at the upper end of the cylinder 7, whilst a second pipe 20 also arranged in the cylinder 7, emerges on the one hand at the base of the latter, and on the other hand at its upper end towards the outside. The pipes 19 and 20 can supply the jack 7, 22 with fluid under pressure, such as compressed air, one of these two pipes receiving compressed air whilst the other is connected to the discharge, so as to cause the piston skirt 22 to slide in one direction or the other inside the cylinder 7. Therefore, if compressed fluid is admitted by the upper pipe 19, the pipe 20 is connected to the discharge, which allows the skirt 22 and the sleeve 21 to slide towards the bottom. The pipes 19, 20 are connected to a device for supplying compressed fluid which is not shown.

Between the lining 10 and the skirt 22, in the annular space reserved between these two parts, a helicoidal spring 26 is arranged of axis X—X, bearing by its bottom end on the flange 12, and pushing upwards the piston constituted by the skirt 22, its head 22a and the sleeve 21 so as to return this piston constantly into its top position.

The cylinder 7 constitutes with the skirt 22 and the head 22a a double-acting jack with a piston 22, 22a automatically returned by the spring 26 into its top position with the head 22a bearing against the head 7a when no fluid under pressure arrives by the pipe 19.

The upstream part C also comprises means for locking and for unlocking the downstream part D, which will be described later at the same time as the additional associated means of the downstream part D and similarly for the compressed fluid and electrical energy connection means of these two parts C, D.

The downstream part D will now be described with particular reference to FIG. 3.

This part D has a central male cone 40 paired with the female cone 70 so that it can be coupled with the latter with which it is coaxial. The cone 40 is fixed to a support flange 30 of the tool associated with the downstream part D, that is to say in the example shown in FIGS. 3 to 5 and 7, the gripping clamp E1. As seen in FIG. 1, each tool E1, E2, E3, . . . is fixed under the flange 30 of the corresponding downstream part D, capable of cooperating with the single upstream part C fixed to the wrist-joint 5 of the robot A.

The means for locking the upstream part C and the downstream part D comprise:

in the upstream part C: locking driving means, integral in translation with the sleeve 21 and which comprise a ball ring 25 housed in a series of orifices 24 arranged in the tubular wall of the movable sleeve 21 inside the fixed lining 10;

in the downstream part D: locking driven means comprising a stem 41 (FIGS. 3 to 5) coaxial with the male cone 40 and having at its end a head 42 capable of sliding inside the central bore 23 of the sleeve 21, and of cooperating with the balls 25 so as to lock in axial translation the parts upstream C and downstream D;

and rolling and bearing surfaces for the balls 25, between the driving and driven locking means. In the upstream part C, these surfaces comprise successively from top to bottom: a bore 14 in the lining 10 for the axial locking of the parts C, D, a flared slope in truncated cone shape 15, and a disengagement bore 16 of greater diameter than the bore 14 in which the sleeve 21 slides. The slope 15 and the disengagement bore 16 allow a radial withdrawal of the balls 25 towards the outside of the sleeve 21 for the axial unlocking of the parts upstream C and downstream D.

The locking head 42 is constituted by a double-conical bulb coaxial with the sleeve 21, composed of two frustums of cone 44, 45 arranged on both sides of a central cylindrical band 43 whose diameter is equal to that of the central bore 23, so as to be able to slide in the sleeve 21. The bottom frustum of cone 45 is capable of bearing on the ball ring 25 in the locked position of the parts upstream C and downstream D.

Figure 6:
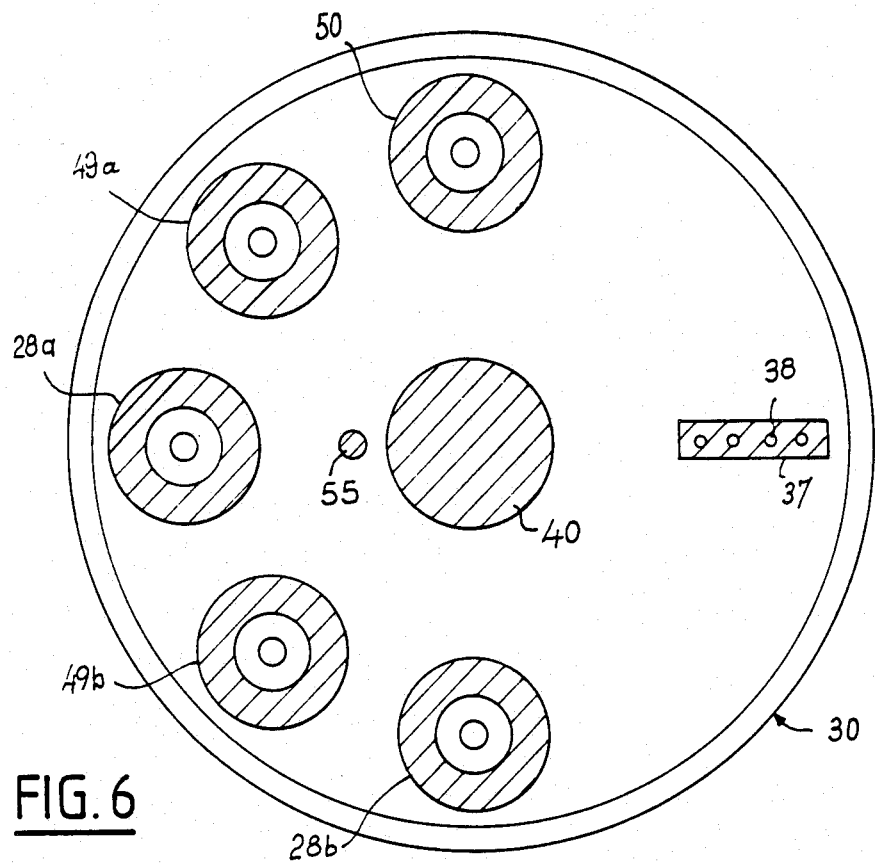
FIG. 6 is a plan view along 6—6 of FIG. 4 of a flange with connections of the downstream part of the tool-holder, on a larger scale compared with FIG. 4.

The parts upstream C and downstream D are supplied with additional connections 28, 32-29, 37 connected to corresponding conduits 2, 33-3, 39. These connections and conduits ensure the supply to the tool E1 (or E2, E3, . . . ), of compressed fluid by the conduits 2, 33 and the corresponding additional connections 28, 32, on the one hand, and of electricity by the conduits 3, 39 and the corresponding additional connections 29, 37, on the other. The connections 28 and 29 connected respectively to conduits 2 and 3, are fixed in the same way as the latter, to a flange 27 projecting around the cylinder 7 with which it is integral. Other connections are provided on the flanges 27 and 30, and are shown in FIG. 6 as far as the flange 30 is concerned. This latter flange thus comprises cooling water entry 49a and exit 49b connections, as well as a suction opening 50 connected to a vacuum pump not shown. FIG. 6 also shows two openings 28a, 28b for receiving end connectors for the compressed fluid supply.

Each of the abovementioned connections, ensuring a supply of liquid or gaseous fluid, under pressure or in depression, or of a cooling fluid (water), is produced in a sealed manner in the following way: the corresponding projecting end connector 28, fixed to the flange 27 can fit, in sealed contact, into a sealing washer 35 provided in a chamber 34 of the connection boss 32 of the flange 30, this washer 35 being fixed to the boss 32 by its periphery being housed between the boss and a cover 36 fixed to this latter by screws 80. The washer 35 has a profile in the shape of a truncated cone paired with the end in the shape of a truncated cone of the end connector 28, which enables a sealed connection to be produced by fitting the end connector 28 into the profile 35 (FIG. 4).

The plug 29 for the electrical energy connection of the tool to the robot A is of the conventional pin type. The male plug 29 fits into the complementary holes 28 of the female connector 37 fixed to the flange 30 of the downstream part D, when the latter is locked to the upstream part C (FIG. 4), thus ensuring the electrical energy supply to the tool from the robot A.

The tool-holder B is equipped with means for making integral in rotation the downstream part D with the upstream part C. These means consist, in the example shown, of a lug 55 projecting from the flange 30, and a corresponding blind hole 18, arranged in the flange 12 of the lining 10.

Figure 3:
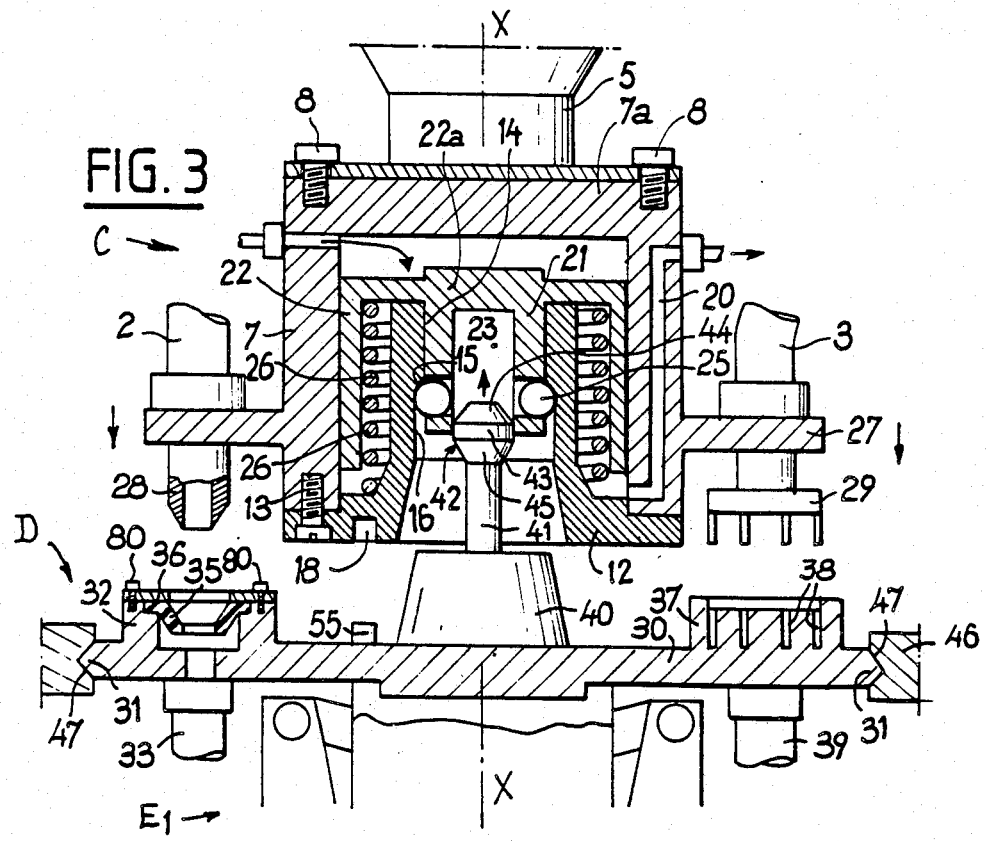
FIG. 3 is an axial section in the same plane as FIG. 2 of the upstream and downstream parts of the tool-holder at the start of an operation of gripping a tool, partly shown before the assembly and the locking of the upstream and the downstream parts.

The flange 30 is suitable for sliding in a support plate 46 forming part of the tool magazine F, by means of V shaped edges with twin bevels 31 capable of sliding in corresponding guide slots 47 in the plate 46 (FIG. 3).

As an alternative, the flange 30 can form with a paired bearing surface on the plate 46, a locked rotary assembly of the bayonet type.

Operation of the tool-holder D

To take, say, a tool E1 on the magazine or rack F with a view to mounting it on the tool-holder B fixed by the cylinder 7 and the screws 8 on the flange 6 of the wrist-joint 5 of the arm 1 of the robot A.

1. Fitting of the downstream part D with a tool onto the upstream part C tool changer (FIG. 3)

The robot A brings the upstream part C or tool changer into the axial extension of axis X—X of the downstream part D corresponding to the tool chosen, for example a clamp E1 engaged by means of its support plate or flange 30 with the support plate 46 of the magazine F.

Under the action of the arm 1 of the robot A, the cylinder 7 (upstream part C) descends and draws closer to the downstream part D.

During this descent, the upper conduit 19 is connected to a source of compressed air and the lower conduit 20 to a discharge (arrows in FIG. 3). As a result, the piston 22, 22a and the movable sleeve 21 are pushed downwards, compressing the spring 26. The balls 25 are withdrawn on this side of the wall of the bore 23 because they are first of all in line with the flared ramp 15, then in line with the disengagement bore 16.

During this descent, the double cone bulb head 42 enters the bore 23 of the movable sleeve 21 and passes through the ring of orifices 24 of which the balls 25 are withdrawn with respect to the bore 23. As the descent of the cylinder 7 of the part C continues, the upper cone 44 passes above the orifices 24, as well as the cylindrical strip 43 and the lower cone 45 of the bulb 42.

The male cone 40 of the downstream part D fits into the female cone 70 of the part C, and the lug 55 of the part D enters the hole 18, which hole serves to position and to make integral in rotation parts C and D. The bulb 42 is then close to the bottom of the bore 23 of the sleeve 21.

When fitting is completed, the descent of the part C stops and the locking is achieved.

2. Locking of parts C and D (FIG. 4)

The compressed air supply is reversed. It arrives at the lower conduit 20 whilst the upper conduit 19 is connected to the discharge (arrows in FIG. 4). The piston 22 of the sleeve 21 rises at the same time under the action of the compressed air and under that of the spring 26 which expands. During this rise, the ball ring 25 which was bearing against the disengagement bore 16 comes to bear first against the flared slope in the shape of a truncated cone 15, then against the wall of the bore 14 and correlatively against the lower cone 45 of the bulb 42, as seen clearly in FIG. 4.

In fact, the successive walls of the slope 15 and of the bore 14 oblige the ball ring 25 to draw closer to the stem 41 and to be applied around the lower cone 45 of the bulb 42, carrying the bulb 42 slightly further upwards under the thrust of the skirt 22. This has the effect of driving the male cone 40 a little further into the female cone 70.

Because of this, during the end of the locking displacement, the ball ring 25 is captive in the radial orifices 24 which are the driving surfaces between the fixed bearing surface of the bore 14 and the movable leading surface or driven surface of the lower cone 45 of the bulb 42. The balls 25 are in precise contact with these various surfaces, in wedged position, which corresponds to a substantial upward thrust and to a very slight displacement upwards of the bulb 42. There is again a rolling contact against the wall of the bore 14, during this very slight displacement, and also a rolling contact in the orifices 24, but a friction contact between the cone 45. This causes the locking of the bulb 42, therefore of the part D with a tool E1 in the tool changer part C.

In locked position, the bulb 42, and more precisely its upper cone 44, is at a certain distance from the bottom of the bore 23 of the movable sleeve 21 (FIG. 4).

This locking is maintained even if, accidentally, the compressed air supply through the lower conduit 20 is interrupted. In fact, even if the force of the spring 26 alone remains to hold up the skirt 22 and the sleeve 21, any substantial continuous downwards force exerted on the lower downstream part D with a view to separating it from the upper upstream part C can only increase the wedging of the ball ring 25 between the precise contact surfaces 14, 45 under the downward thrust of the bulb 42 and consequently a wedging of the said balls 25 against the fixed bearing surface 14, with friction contacts against this surface 14 and against the lower cone 45.

3. Energy and fluid connections during the fitting of parts C and D

During fitting, the axes Y—Y of the respective connections of parts C and D coincide and the connections are in relative movement together.

(a) The end connector 28 of the compressed air conduit 2 enters the boss 32 up to the position of contact with the elastic sealing washer 35. In the free state (FIG. 3), the conicity of this washer 35 is slightly greater than that of the end connector 28 (the angle at the center of the cone of the washer 35 is slightly greater than that of the end connector 28). As a result, the introduction of the end connector 28 into the washer 35 tends to increase forcibly the conicity of the latter, so that the conical profile of the washer 35 is applied and tightened by reaction in a sealed manner on the end connector 28.

Compressed air can now be allowed to enter the conduits 2 and 33, for example to supply a small jack, not shown, for opening and closing the clamp E1.

(b) The plug 29 of the part C is connected by its pins to the connection with a boss 37 and with holes 38 of the part D. The electrical supply can now be brought in through the supply cable 3, therefore through cable 39. This electrical supply may be used for example to supply small electromagnets with which the jaws of the clamp E1 would be provided with a view to facilitating the gripping of a magnetic object to be held.

In a similar manner the connection 50 (FIG. 6) for a vacuum or suction intake could be connected to suction devices if the jaws of the clamp E1 were provided with them, although this is not shown. In the case of tool E2 which is a suction gripping device, it is of course the suction conduit of the connection 50 which would be used.

For a machining tool, such as for example a milling tool (tool E3), the connection 49a can be used, with a cooling water flow. The electrical plug 29 can also be used to supply the motor M for driving in rotation the milling tool (tool E3).

In the case, which is not shown, where the tool E of the part D would require a continuous cooling by water circulation, it would be connected by means of connections on the flange 27 and on the flange 30 to the cooling water entry 49a and to the cooling water exit 49b. Such a tool could be, for example, a spot welding clamp with transformer cooled by water or electrodes cooled by water, or again by a simple jet of water or of oil.

After connection has been made on the flange 27 and the support flange 30, it is possible that certain fluids and energy will not be used by the tool which has just been connected and locked. In this case, all that is required is to prevent the entry of these fluids and energy into the conduits concerned. A plug can also be placed in the bottom of the chamber 34 or again the annular washer 35 can be replaced by a full washer or circular diaphragm.

4. Removal of the tool E1 from the magazine F and operation

The tool E1 (a clamp for example) being thus held and locked by the coupling of the parts C and D, the robot A causes it to slide by its support flange 30 along the slots 47 of the magazine F until the flange 30 leaves the slots and until the part D is thus freed from the magazine F. In the case where the support plate 30 and the slot 47 are circular with a bayonet locking system, with additional lugs, there would be first an unlocking rotation, then an upward movement of the support flange 30.

For the operation of the clamp E1 consisting for example in holding and manipulating a part to be machined, not shown, compressed air is introduced into the conduit 2 and into the conduit 33 to open and close the clamp E1. If required, an electrical supply would also be allowed to pass through cable 3 and through cable 39 with a view to supplying possible electromagnets with which the jaws of the clamp E1 would be provided. Finally the rotary wrist-joint 5 of the robot A causes the tool E1 to turn about the axis X—X of the tool holder B due to the parts C and D being coaxial, and due to the parts C and D being made integral in rotation by the hole 18 and the lug 55.

5. Return of the tool E1 to the magazine F and unlocking then separation of the parts C and D (FIG. 5):

The tool E1 is first brought to the magazine F: a maneuver to engage the support flange 30 in the slots 47 is carried out (with a rotational maneuver in the case of a bayonet locking) The unlocking and separation maneuvers of the parts C and D are then carried out.

With a view to unlocking, compressed air is suddenly allowed to enter via the upper conduit 19 of the cylinder 7 whilst putting the lower conduit 20 to discharge. This sudden entry of fluid under pressure projects the piston skirt 22 downwards in opposition to the spring 26 which is compressed. As a result, the bottom of the bore 23 of the sleeve 21 strikes a veritable hammer blow on the upper cone 44 of the double coned bulb 42. This hammer blow frees the male cone 40 from the female cone 70 of the part C, causing the sleeve 21 to slide in the bore 14 of the lining 10. The downward displacement of the sleeve 21 with respect to the lining 10 frees the balls 25 from their wedged position, causes them to roll first of all against the wall of the bore 14 then on the flared slope in the shape of a truncated cone 15, which enables their subsequent radial spacing outside the bore 23 of the sleeve 21 under the action of the lower cone 45.

The travel towards the bottom of the sleeve 21 is completed by a suitable compressed air supply through the conduit 19.

The robot A, which maneuvers the wrist-joint 5, then causes the cylinder 7 to be raised in the movement opposite to that in FIG. 3, so that the bulb 42 slides downwards in the bore 23, pushes the balls 25 against the disengagement bore 16 by its cone 45, passes through the sill of the ball ring 25 and leaves the bore 23.

The coupling cones 70 and 40 separate. The robot A brings the part C and leaves the part D in the magazine F.

Simultaneously, the fluids and electrical energy connections separate after the fluids and energy supplies have been cut off, in order to avoid leaks (water, compressed air) or sparks on disconnection causing deterioration of the electrical contacts.

As soon as the upper part C has been completely detached from the lower part D (FIG. 2), the compressed air supply is brought to the lower conduit 20 whilst the upper conduit 19 is connected to the discharge, which causes the skirt 22 of the sleeve 21 to be raised upwards under the action of the compressed air and of the spring 26.

Advantages of the tool-holder B according to the invention

Because of the one-piece nature of the tool E1 (or E2 or E3), gripped by the tool-holder B and of the low weight of the tool-holder B and of the tool supported by the end of the arm 1 of the robot A, ease and speed of the robot's arm movements in space is ensured.

The one-piece nature of the tool E1 (or E2 or E3) carried by the tool-holder B of the invention offers the benefits of the specific suitability of the tool to the task which it must carry out. This perfect specific suitability of the tool, that is to say the perfect suitability of the tool for its task, ensures maximum operating reliability of the robot A tool-holder B system.

The separation of the tool-holder B into two parts C and D capable of being coupled or uncoupled and capable of being locked, in a rapid manner, by simple relative movement of sliding or of translation, ensures a rapid change which can be automated.

Again because of the one-piece nature of the tool E1 (or E2 or E3) on the tool-holder B, the tool-holder B and the tool E1 (or E2 or E3) assembly benefits from minimum size, which can facilitate the accessibility of the tool transported by the robot A in certain restricted spaces.

The coaxiality of the parts C and D of the tool-holder B along the axis X—X, and their being integral in rotation allows the wrist-joint 5 of the robot A to ensure a complete rotation of the tool E1, E2, E3, . . . about the axis X—X, if the robot A is operated for this purpose. As a result, the single tool transported can be used for a screwing or an unscrewing operation, or again for an angular orientation of a part during a movement of rotation about the axis X—X.

The combination of the ball ring 25 of the bore 14, of the disengagement 16, of the slope in the shape of a truncated cone 15, of the sleeve 21 with radial orifices 24, with a bore 23, and of the double cone bulb 42 guarantees the achievement of a powerful locking of the part D with a tool in the tool changer part C.

The combination of the bottom of the bore 23 of the sleeve 21, forming a hammer, and of the upper part of the upper cone 44 forming an anvil, and the mobility of the sleeve 21 with piston skirt 22 inside the cylinder 7 forming a jack body allows the unlocking to be achieved by a veritable hammer blow on the bulb 42 to free the cone 40 of the tool from the cone 70 of the tool changer.

The operating of this jack with a cylinder 7 and with a piston skirt 22 also contributes to the introduction of the bulb 42 in the bore 23, and to its locking by the ball ring 25 forced into a position between the bore 14 and the lower cone 45 of the bulb 42.

Finally, because of the connections such as the end connector 28 and the boss 32 with a sealing washer 35 for a fluid, and the plug 29 cooperating with the boss 37 for the electricity, the fluids and the electrical energy can be brought by the robot A and connected and disconnected automatically during the coupling or during the separation of the parts C and D.

Figure 7:
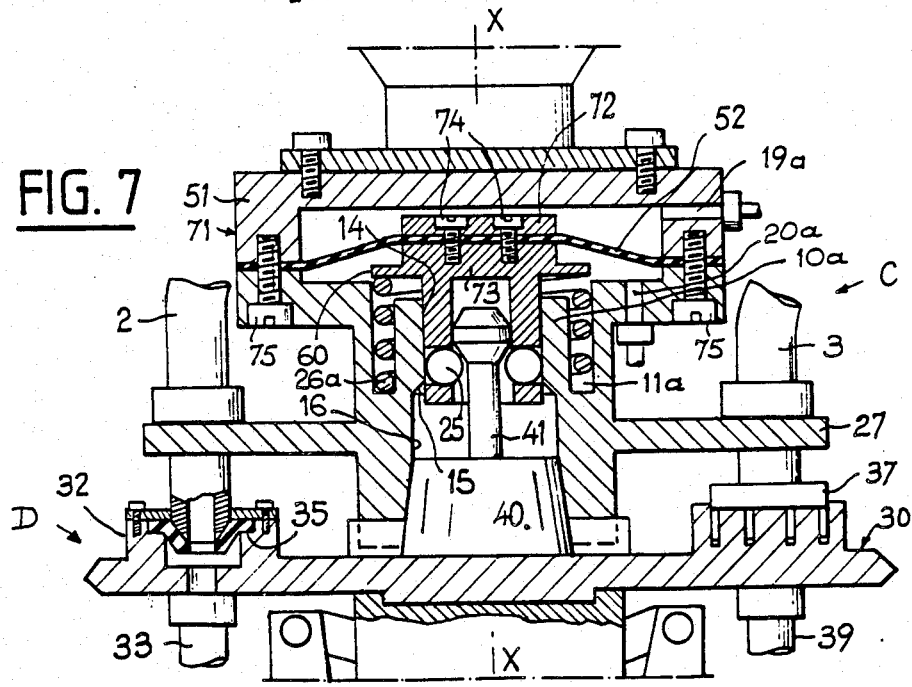
FIG. 7 is a vertical axial section of an alternative embodiment of the tool-holder in locked position.

In the alternative embodiment illustrated in FIG. 7, the drive component provided to displace the locking and unlocking means is a jack provided with a flexible diaphragm 52 fixed at its periphery to the body 51 of a cylinder 71 of axis X—X. In its central area, the flexible diaphragm 52 passes through the top 72 of a sleeve 73 coaxial with the cylinder 71, the fixing of the diaphragm 52 to the sleeve 73 being ensured by screws 74. The sleeve 73 can slide inside a fixed lining 10a made of one piece with the body 51, the sleeve 73 being provided with an annular flange 60 pulled elastically by a helicoidal return spring 26a housed in a groove 11a coaxial with the lining 10a.

The fixing of the diaphragm 52 at its periphery to the body 51 is ensured by a set of screws 75 engaged in the body 51.

The diaphragm 52 has the function of displacing the sleeve 73 under the action of a fluid under pressure brought, either onto its upper face by a conduit 19a formed in the body 51 and emerging between the bottom of the latter and the diaphragm 52, or by a conduit 20a emerging inside the body 51 on the opposite face of the diaphragm 52.

The functioning of this alternative embodiment is the same as that of the previous embodiment.

I claim:

1. A tool holder (B) for gripping and changing tools used by an industrial robot (A), said tool holder including an upstream part (C) for connection to a rotary wrist-joint (5) of a robot arm (1) and at least one downstream part (D) to be fixed to and remain integral with a tool (E1, E2 . . . ) at each tool change; said upstream part and each downstream part including cooperating means for the rapid assembly and locking together of said upstream part and a downstream part and for the rapid unlocking and disassembly of a previously assembled and locked together upstream and downstream parts, said cooperating means comprising;

in the upstream part, locking and unlocking means comprised of a double acting jack unit which includes a cylinder portion (7, 71), a piston means (21, 22, 22a, 60, 72, 73) for reciprocating along an axis X—X in said cylinder portion between a locking position and an unlocking position and spring means for biasing said piston means into its locking position, said cylinder portion having an interior lining (10, 10a), said lining defining successively from its top to its bottom a generally cylindrical locking bore (14), a first flared slope section in the shape of a truncated cone (15), a generally cylindrical unlocking bore (16) having a diameter greater than that of said locking bore, and a second flared slope section in the shape of a female cone (70), said piston means comprising a head portion (22a, 72), a flange portion extending from said head portion and over a portion of said cylinder portion (7, 71), and a sleeve portion (21, 73) having a central bore with an open lower end and a top end closed by said head portion, said sleeve portion extending below said head portion and coaxial with said cylinder portion (7, 71), said sleeve portion including at least one orifice (24) and at least one ball (25) radially movable in said orifice, said ball having a diameter such that when the orifice of said sleeve portion is in registration with said lining locking bore (14) the ball extends into the central bore of the sleeve to define a locking position and when said sleeve portion is in registration with said lining unlocking bore (16) the ball may be radially withdrawn from said central bore into an unlocking position, and in the downstream part, a support means (30) fixedly attached to a tool for supporting a tool on said downstream part, a male cone portion (40) extending from said supporting means and cooperating with said femal cone (70) for quickly aligning said downstream part with said upstream part during assembly of said two parts, a stem (41) extending from said male cone, said stem having a double cone locking head (42) at its end opposite its end connected to said male cone, said stem being receivable into said central bore of said sleeve portion (21, 73) when said piston means is in its unlocking position; and means for forcing said piston means to its unlocking position against the bias of said spring means, said flange portion of said piston means striking said portion of said cylinder portion over which it lies when moved to its unlocking position, whereby said downstream part can be forced out of engagement with the upstream part by the hammer action realized as the flange portion of the piston means strikes the portion of the cylinder portion over which it lies.

2. Tool-holder as claimed in claim 1, wherein the stem head (42) of the downstream part (D) is composed of a double coned bulb coaxial with the sleeve (21) and with the cylinder (7), this bulb being comprised of two cone frusta (44, 45) arranged on either side of a central cylindrical strip (43) whose diameter is equal to that of the central bore (23) of the sleeve (21), the lower frustum (45) being capable of bearing on the ball (25) in the locking position of the upstream (C) and downstream (D) parts.

3. Tool-holder as claimed in claim 1, wherein the upstream (C) and downstream (D) parts are provided with additional connections (28-32, 29-37) connected to corresponding conduits (2-33, 3-39) to ensure supply to the tool on the one hand of a compressed fluid and on the other of electricity, connections for inlet and outlet (49a, 49b) of the cooling water, as well as for suction (50) also being provided on the upstream part (C), which for this purpose carries a connecting flange (27) integral with the cylinder portion (7).

4. Tool-holder as claimed in claim 3, wherein each supply connection for liquid or gaseous fluid under pressure or for a cooling fluid is made in a sealed manner by means of a projecting end connector (28) fixed to the flange (27) of the upstream part (C) and which can be fitted in sealed contact into a sealing washer (35) provided inside a connection boss (32) formed on the flange (30) of the downstream part (D).

5. Tool holder as claimed in claim 4, wherein the projecting end connector (28) is in the shape of a truncated cone and the paired sealing washer (35) has a profile also in the shape of a truncated cone and is fixed at its periphery between the boss (32) and a cover (36) fixed onto the boss (32).

6. Tool-holder as claimed in claim 3, wherein the electrical connection is made by means of a plug (29) with pins, the plug (29) being fixed on the flange (27) of the upstream part (C) and by means of a boss (37) integral with the flange (30) of the downstream part (D), the boss (37) comprising holes (38) complementary with the pins of the plug (29).

7. Tool-holder as claimed in claim 1, further including means for preventing rotation of the downstream part (D) which carries the tool (E1, E2, . . . ) relative to the upstream part (C), said rotation preventing means comprising a lug (55) projecting from the supporting means (30) of the downstream part (D) and a corresponding blind hole (18) arranged in the bottom of the cylinder portion of the upstream part (C).

8. Tool-holder as claimed in claim 1, wherein the upstream part (C) further includes, as driving component to displace the piston means from the cylinder portion, a flexible diaphragm (52), the diaphragm being fixed at its periphery to the body (51) of the cylinder portion (71) and at another portion thereof to said piston means, the diaphragm (52) being intended to displace the sleeve portion (73) under the action of a fluid under pressure supplied through one of the faces of the sleeve portion carrying conduits (19a, 20a) for fluid inlet and exhaust.

9. Tool-holder as claimed in claim 3, wherein the downstream part (D) comprises a flange which is suitable for sliding in a support plate (46) of a tool magazine (F) by means of twin-bevelled V-shaped edges (31) capable of sliding in the corresponding guide slots (47) of the plates (46).

10. Tool-holder as claimed in claim 8, wherein the top (22a) of the sleeve portion (21, 73) cooperates by percussion, like a hammer, with the locking head (42) under the action of a fluid under pressure brought to the upper end of the cylinder portion (7-51) of the jack.

11. The tool holder as claimed in claim 1, wherein said cylinder portion comprises a first generally cylindrical section with an outwardly extending flange (27) and a second generally cylindrical section interior to and partially spaced from said first generally cylindrical section, said spring means being located in said space (11) between said first and second cylindrical sections, said flange portion of said piston means overlying at least a portion of the upper surface of said second generally cylindrical section.

12. The tool holder as claimed in claim 11, wherein said second generally cylindrical section includes an outwardly extending flange (12) a portion of which extends over at least a portion of the lower surface of said first generally cylindrical section, and further including fastening means for fastening said second generally cylindrical section to said first generally cylindrical section in the area where said outwardly extending flange (12) of said second generally cylindrical section extends over the lower portion of the first generally cylindrical section.

13. The tool holder as claimed in claim 11, wherein said first and second generally cylindrical sections of the cylinder portion are integral.

14. The tool holder as claimed in claim 1, wherein said means for forcing said piston means is a pneumatic means, said cylinder portion including an inlet (19) and an outlet (20) for receiving and exhausting, respectively, the fluid supplied by said pneumatic means.

* * * * *